United States Patent Office 3,808,336
Patented Apr. 30, 1974

3,808,336
PHARMACEUTICAL COMPOSITIONS AND METHODS OF INHIBITING HISTAMINE ACTIVITY WITH THIOUREA DERIVATIVES
Graham John Durant, Welwyn Garden City, John Colin Emmett, Codicote, Charon Robin Ganellin, Welwyn Garden City, and George Raymond White, Harpenden, England, assignors to Smithkline Corporation, Mundells, Welwyn Garden City, England
No Drawing. Continuation-in-part of abandoned application Ser. No. 145,024, May 19, 1971. This application Dec. 6, 1972, Ser. No. 312,438
Claims priority, application Great Britain, June 25, 1970, 30,834/70; Oct. 15, 1970, 49,007/70; Jan. 22, 1971, 2,918/71
Int. Cl. A61k 27/00
U.S. Cl. 424—273                13 Claims

ABSTRACT OF THE DISCLOSURE

Pharmaceutical compositions and methods of inhibiting histamine activity with N-heterocyclic-alkylthioureas.

This application is a continuation-in-part of Ser. No. 145,024, filed May 19, 1971, now abandoned.

This invention relates to pharmaceutical compositions and methods of inhibiting histamine activity, and more particularly to inhibiting H–2 histamine receptors, with thiourea derivatives. The thiourea derivatives can exist as the addition salts, but for convenience, reference will be made throughout this specification to the parent compounds.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (Brit. J. Pharmac. Chemother. 27:427, 1966) as H–1. The thiourea derivatives of the pharmaceutical compositions and methods of the present invention are distinguished by the fact that they act at histamine receptors other than the H–1 receptor, that is they act as H–2 histamine receptors which are described by Black et al., Nature 236, 385 (1972). Thus they are of utility in inhibiting certain actions of histamine which are not inhibited by the above-mentioned "antihistamines." Inhibitors of H–2 histamine receptors are useful, for example, as inhibitors of gastric acid secretion and as anti-inflammatory agents particularly where the inflammation is kinin-mediated.

The thiourea derivatives which are the active ingredients of the pharmaceutical compositions of this invention and are used in the methods of inhibiting H–2 histamine receptors according to this invention may be represented by the following formula, in which it will be understood that the structure of the nucleus is such that the bond between the carbon and nitrogen atoms might equally well be represented as a double bond:

FORMULA I

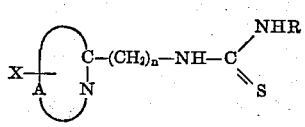

in which:

A is a chain of 3 to 4 atoms of which 1 to 2 atoms are nitrogen or 1 of which is sulphur in the position alpha to the carbon atom and the remainder are carbon, which chain forms an unsaturated ring with the carbon and nitrogen atoms to which it is attached;

$n$ is from 3 to 6;

R is hydrogen, lower alkyl, benzoyl or substituted or unsubstituted phenylethyl.

X is hydrogen, lower alkyl, halogen or lower alkylthio or a pharmaceutically acceptable acid addition salt thereof.

Preferably, the thiourea derivatives of the pharmaceutical compositions and methods of this invention are represented by Formula I in which:

A is such that with the carbon and nitrogen atoms shown it forms a thiazolyl ring or an imidazolyl ring, advantageously 4(5)-imidazolyl;

$n$ is 4;

R is methyl and

X is hydrogen or halogen, advantageously hydrogen or bromo or a phamaceutically acceptable acid addition salt thereof.

Specific compounds which are found to be particularly useful are

N-methyl-N'-(4-(4-(5)-imidazolyl)butyl)thiourea,
N-methyl-N'-(4-(5-bromo-4-imidazolyl)butyl)-thiourea and
N-methyl-N'-(4-(2-thiazolyl)butyl)thiourea.

These compounds are referred to hereinafter as the "specific preferred" compounds. The compounds of Formula I may be produced by processes which commence with an amino compound of the following formula:

FORMULA II

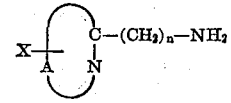

in which A, X and $n$ have the same significance as in Formula I.

The compounds of Formula I in which R is benzoyl may be prepared from an amine of Formula II by reaction with benzoyl isothiocyanate in an appropriate solvent such as chloroform. Alkaline hydrolysis of these compounds with a reagent such as aqueous potassium hydroxide or aqueous potassium carbonate yields the compounds of Formula I wherein R is hydrogen.

Compounds of Formula I wherein R is hydrogen may alternatively be prepared from the amine of Formula II by reaction at elevated temperature with the thiocyanate of ammonium or of a metal such as sodium or potassium. The compounds of Formula I where R is lower alkyl or substituted or unsubstituted phenylethyl may be prepared from the amine of Formula II by reaction with an isothiocyanic ester of forming R—N=C=S in an appropriate solvent such as chloroform, ethanol or acetonitrile. Alternatively the amine of Formula II may be converted by reaction with carbon disulphide to the dithiocarbamic acid of the formula:

FORMULA III

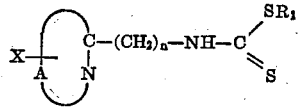

in which A, X and $n$ have the same significance as in Formula I and $R_1$ is hydrogen and then methylated to yield the compound of Formula III in which $R_1$ is methyl. Finally, reaction of this methyl ester with an amine of formula $RNH_2$, wherein R is lower alkyl or substituted or unsubstituted phenylethyl yields the required compound of Formula I wherein R is lower alkyl or substituted or unsubstituted phenylethyl.

The dithiocarbamic acid of Formula III where $R_1$ is hydrogen may alternatively be treated with a heavy metal salt such as mercuric acetate to form an isothiocyanate of the formula

FORMULA IV

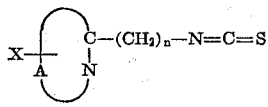

which may finally be treated with an amine of the formula $RNH_2$ wherein R is hydrogen, lower alkyl or substituted or unsubstituted phenylethyl to yield the required compound of Formula I.

In the case of those compounds where X is not hydrogen, this substituent may be introduced into the corresponding amine i.e. to form a compound of Formula II. For example the 2-methylthio-imidazolyl derivatives may be formed by methylation of the corresponding imidazole-2-thiones and the 5(4)-bromo-imidazoles by the bromination of the corresponding compounds wherein X is hydrogen.

The pharmaceutical compositions of this invention to inhibit H–2 histamine receptors comprise a pharmaceutical carrier and a thiourea compound of Formula I or a pharmaceutically acceptable acid addition salt thereof. The active ingredient will be present in the compositions of this invention in an effective amount to inhibit H–2 histamine receptors.

The method of inhibiting H–2 histamine receptors, according to this invention, comprises administering to an animal in an amount sufficient to inhibit H–2 histamine receptors a thiourea compound of Formula I or a pharmaceutically acceptable acid addition salt thereof. The thiourea compound is preferably administered in a dosage unit form.

Another object of this invention is a method of inhibiting gastric acid secretion which comprises administering internally to an animal in an amount sufficient to inhibit gastric acid secretion a thiourea compound of Formula I or a pharmaceutically acceptable acid addition salt thereof.

The compounds of Formula I may be combined with a pharmaceutically acceptable carrier to form pharmaceutical compositions. Advantageously the compositions will be made up in a dosage unit form appropriate to the desired mode of administration. The pharmaceutical carrier employed may be, for example, either a solid or liquid. Exemplary of solid carriers are lactose, terra alba, sucrose, talc, gelatin, agar pectin, acacia, magnesium stearate, stearic acid and the like. Exemplary of liquid carriers are syrup, peanut oil, olive oil, water and the like. Other pharmacologically active compounds may in certain cases be included in the pharmaceutical compositions.

As stated above, the thiourea compounds of Formula I have been found to have pharmacological activity in the animal body as antagonists to certain actions of histamine which are not blocked by "antihistamines" such as mepyramine. For example, they have been found to inhibit selectively the histamine-stimulated secretion of gastric acid from the lumen-perfused stomachs of rats anaesthetized with urethane, at doses from 2 to 256 micromoles per kilogram intravenously. This procedure is described in the above-mentioned paper of Ash and Schild. The "specific preferred" compounds as hereinabove defined are active in this test at doses from 2 to 32 micromoles per kilogram and show a 50% inhibitory effect ($ID_{50}$) at from 2 to 15 micromoles per kilogram. Similarly, the action of these compounds and compositions may, in many cases, be demonstrated by their antagonism to the effects of histamine on other tissues which, according to the above-mentioned paper of Ash and Schild, are not H–1 receptors. Examples of such tissues are the lumen-perfused stomachs of anaesthetized cats, Heidenhain pouch dogs, perfused isolated guinea-pig heart, isolated guinea-pig right atrium and isolated rat uterus. For example, in isolated guinea-pig right atrium the "specific preferred" compounds show an $ID_{50}$ of from 2 to 10 micromoles per liter.

The compounds of the method of this invention inhibit the secretion of gastric acid stimulated by pentagastrin or by food. In addition, these compounds also show anti-inflammatory activity in conventional tests such as the rat paw oedema test and u.v. erythema test. In the rat paw oedema test where the oedema is induced by Bradykinin or by the histamine releasing agent known as compound 48/80, the paw volume is reduced significantly by subcutaneous injection of doses of about 500 micromoles/kg. i.e. a dose per single rat of about 15 mg. For example, in such a test, N-methyl-N'-(4-(4(5)-imidazolyl)butyl)thiourea reduced the volume of rat paw oedema induced by Bradykinin by 90%. The level of activity found for the compounds used in the method of the present invention is illustrated by the effective dose range in the anaesthetized rat, that is from 8 to 256 micromoles per kilogram, given intravenously, and also by the dose effective in the rat paw oedema test.

A wide variety of pharmaceutical forms can be employed. Thus if a solid carrier is used, the preparation can be tableted, placed in a hard gelatin capsule in powder or pellet form, or in the form of a troche or lozenge. The amount of solid carrier will vary widely but preferably will be from about 25 mg. to about 1 gm. If a liquid carrier is used, the preparation may be in the form of a syrup, emulsion, soft gelatin capsule, sterile injectable liquid such as ampoule, or an aqueous or nonaqueous liquid suspension.

The pharmaceutical compositions are prepared by conventional techniques involving procedures such as mixing, granulating and compressing or dissolving the ingredients as appropriate to the desired preparation.

The active ingredient will be present in the composition in an effective amount to inhibit H–2 histamine receptors. The route of administering may be internally e.g. orally, parenterally or may be topically.

In the case of oral or parenteral administration, each dosage unit will preferably contain the active ingredient in an amount of from about 100 mg. to about 250 mg. The active ingredient will preferably be administered in equal doses three to six times per day. The daily dosage regimen will preferably be from about 750 mg. to about 1000 mg.

For therapeutic use, the pharmacologically active compounds of the present invention will normally be administered as a pharmaceutical composition comprising as the or an essential active ingredient at least one such compound in the basic form or in the form of an addition salt with a pharmaceutically acceptable acid and in association with a pharmaceutical carrier therefor. Such addition salts include those with hydrochloric, hydrobromic, hydriodic, sulphuric, picric and maleic acids and the addition salt with one of these acids may readily be converted to that with another. Such conversion may be effected by means of ion-exchange techniques. A particularly useful method which also in many cases effects purification to a sufficient degree to allow the resultant solution of the addition salt to be used for pharmacological estimations involves the formation of the picrate salt and conversion therefrom to the chloride salt.

Advantageously the composition will be made up in a dosage form appropriate to the desired mode of administration for example, as a tablet, capsule injectable solu-

EXAMPLE 1

Preparation of N-benzoyl-N'-[3-(4(5)-imidazolyl) propyl]thiourea

A solution of benzoyl isothiocyanate (65.2 g.) in chloroform is added slowly to a solution of 4(5)-(3-aminopropyl)-imidazole (50.0 g.) in chloroform (1.5 l.). The resultant solution is subsequently heated at reflux temperature for two hours and concentrated under reduced pressure. The residue is dissolved in ethanol and added to an excess of distilled water which results in the precipitation of a white solid. Recrystallization from ethyl acetate yields N-benzoyl-N'-[3-(4(5)-imidazolyl)-propyl] thiourea, M.P. 145–148° C.

EXAMPLE 2

Preparation of N-[3-(4(5)-imidazolyl)propyl]thiourea

N-benzoyl-N'-[3-(4(5)-imidazolyl)propyl]thiourea (47 g.) is added, with stirring, to a solution of potassium carbonate (13.8 g.) in water (800 ml.) at 60–70° C. Subsequent heating at this temperature for one hour gives a clear solution which is treated with charcoal and concentrated to low bulk. Cooling yields N-[3-(4(5)-imidazolyl)propyl]thiourea, M.P. 149–150° C. as a colorless solid. Analytically pure material having the same M.P. is obtained by recrystallization from water.

EXAMPLE 3

Preparation of N-methyl-N'-[3-(4(5)-imidazolyl) propyl]thiourea

Methyl isothiocyanate (2.92 g.) is added to a solution of 4(5)-(3-aminopropyl)imidazole (5.0 g.) in chloroform (100 ml.) and dimethylformamide (10 ml.). The resultant solution is heated under reflux for 2.5 hours and evaporated to dryness. The residue is treated with ethanolic hydrogen chloride which affords a hygroscopic hydrochloride. This is recrystallized from ethanol-ether and converted to the base with aqueous potassium carbonate. Evaporation followed by extraction with ethanol yields the crude base which after recrystalization from water yields pure N-methyl-N'-(3-(4(5)-imidazolyl)propyl) thiourea, M.P. 135–137° C.

EXAMPLE 4

Preparation of N-ethyl-N'-(3-(4(5)-imidazolyl) propyl)thiourea

Ethyl isothiocyanate (4.2 g.) is added slowly to a solution of 4(5)-(3-aminopropyl)imidazole (6.0 g.) in acetonitrile (25 ml.). The resultant solution is heated under reflux for 2 hours during which time a white solid is deposited. After cooling, the white solid is collected and washed wth acetonitrile affording N-ethyl-N'-(3-(4 (5)-imidazolyl)propyl)thiourea, M.P. 145–148° C.

EXAMPLE 5

Preparation of N-benzoyl-N'-(4-(4(5)-imidazolyl) butyl)thiourea

Benzoyl isothiocyanate (7.5 g.) is added dropwise to a solution of 4(5)-(4-aminobutyl)imidazole (4.8 g.) in chloroform (350 ml.) containing a little ethanol (1.6 g.) and the mixture is boiled under reflux for three hours and then concentrated under reduced pressure. The residue is dissolved in hot ethanol and then distilled water is added until an oil begins to precipitate. The mixture, after storing at 0° C. for 16 hours, contains a granular solid which is collected and recrystallized from 10% aqueous ethanol to afford the thiocyanate salt of N-benzoyl-N'-(4-(4(5)-imidazolyl)butyl)thiourea as colorless crystals M.P. 139–140° C.

EXAMPLE 6

Preparation of N-[4-(4(5)-imidazolyl)butyl]thiourea

N-benzoyl-N'-[4-(4(5)-imidazolyl)butyl]thiourea hydrothiocyanate (1.5 g.) is added with stirring to 10% aqueous potassium hydroxide (30 ml.) at 65–70° C. After 15 minutes the mixture is cooled, acidified with dilute hydrochloric acid, and after two hours at 5° C. is filtered from the benzoic acid which precipitates. The filtrate is basified with anhydrous potassium carbonate and concentrated to dryness under reduced pressure to yield a residue which is extracted with hot ethanol. The extract is concentrated to 5 ml. and cooled to yield colorless crystals. The latter, after being crystallized from water (9 ml.) furnishes N-[4-(4(5)-imidazolyl)butyl]thiourea, M.P. 166–167° C.

EXAMPLE 7

Preparation of N-methyl-N'-[4-(4(5)-imidazolyl) butyl]thiourea

4(5)-(4-aminobutyl)imidazole (15.0 g., containing approximately 12% w./w. ethanol) is dissolved in warm acetonitrile (100 ml.). The solution is filtered, methyl isothiocyanate (7.3 g.) is added and the resultant solution is heated under reflux for 1.5 hours. Following concentration, the residual oil is triturated several times with warm isopropyl acetate which affords the thiourea in crystalline form.

Recrystallization from acetonitrile-isopropyl acetate yields N-methyl-N-[4-(4(5)-imidazolyl)butyl]thiourea. After further recrystallization from acetonitrile, followed by recrystallization from water, the product melts at 127–128° C.

EXAMPLE 8

Preparation of N-ethyl-N'-[4-(4(5)-imidazolyl) butyl]thiourea

4(5)-(4-aminobutyl)imidazole (2.0 g., containing 8% w./w. ethanol) is caused to react with ethyl isothiocyanate (1.15 g.) in acetonitrile by a procedure similar to that described in Example 7. Recrystallization from acetonitrile-isopropyl acetate finally affords N-ethyl-N'-(4-(4(5)-imidazolyl)butyl)thiourea, M.P. 114–116° C.

EXAMPLE 9

Preparation of N-isopropyl-N'-(4(4(5)-imidazolyl) butyl)thiourea

4(5)-(4-aminobutyl)imidazole (1.3 g.) is caused to react with isopropyl isothiocyanate (1.0 g.) by a procedure similar to that described in Example 7. Recrystallization from aqueous isopropyl alcohol affords N-isopropyl-N'-(4-(4(5)-imidazolyl)butyl)thiourea M.P. 138–139° C.

EXAMPLE 10

Preparation of N-(n-butyl)-N'-(4-(4(5)-imidazolyl) butyl)thiourea

4(5)-(4-aminobutyl)imidazole (2.0 g., containing 8% w./w. ethanol) is caused to react with n-butyl isothiocyanate (1.7 g.) by a procedure similar to that described in Example 7. The product obtained is converted into its maleate salt with maleic acid in ethanol. Recrystallization from isopropyl alcohol-ether affords N-(n-butyl)-N'-(4-(4(5)-imidazolyl)butyl) thiourea maleate, M.P. 137–139° C.

EXAMPLE 11

Preparation of N1(2-phenylethyl)-N'-(4-(4(5)-imidazolyl)butyl)thiourea

4(5)-(4-aminobutyl) imidazole (2.5 g., containing 8% w./w. ethanol) is caused to react with 2-phenylethyl isothiocyanate (2.71 g.) by a procedure similar to that described in Example 7. The product obtained is converted into its maleate salt with maleic acid in ethyl acetate.

Recrystallization from isopropyl alcohol-ether affords N-(2-phenylethyl)-N'-[4-(4(5)-imidazolyl) - butyl]thiourea maleate, M.P. 124–126° C.

EXAMPLE 12

Preparation of N-methyl-N'-[5-(4(5)-imidazolyl) pentyl]thiourea (i) A mixture of 1-bromo-7-phthalimidoheptan-2-one (obtainable from ε-aminocaproic acid) (60.0 g.) and formamide (360 ml.) is heated at 180–185° C. for two hours. Following removal of excess formamide by distillation under reduced pressure, the residue is hydrolysed by heating under reflux with 6N hydrochloric acid (1.8.1.) for 18 hours. After cooling to 0° C. and filtering to remove phthalic acid, the filtrate is concentrated under reduced pressure and the residue extracted with hot ethanol and again concentrated. The residual amine hydrochloride is converted to the free base by passage down an ion-exchange resin (OH—) and elution with methanol. The base obtained is converted into the picrate with picric acid (82.5 g.) in water. The picrate is recrystallized several times from water affording 4(5)-(5-amino - pentyl)imidazole dipicrate, M.P. 209–211° C. Melting point of an analytically pure sample (from nitromethane) is 210–211° C.

The picrate is treated with hydrochloric acid in the usual way yielding the amine dihydrochloride which is finally converted to 4(5)-(5-aminopentyl)imidazole, M.P. 45–48 ° C., by passage down ion-exchange resin (OH—).

(ii) A solution of methyl isothiocyanate (2.92 g.) and 4(5)-(5-aminopentyl)imidazole (6.13 g.) in acetonitrile (40 ml.) is heated under reflux for three hours. Cooling, followed by recrystallization of the product from acetonitrile affords N - methyl-N'[5-(4(5)-imidazolyl)pentyl] thiourea, M.P. 108–109° C.

EXAMPLE 13

Preparation of N-(2-p-hydroxyphenyl)ethyl-N'-(4-(4(5)-imidazolyl)butyl)thiourea

Tyramine hydrochloride (4.4 g.) is converted into its base with sodium (0.6 g.) in ethanol. A solution prepared from the base in ethanol (200 ml.) and water (6.5 ml.) is added to a solution prepared from mercuric acetate (5.7 g.) in ethanol (100 ml.) containing water (3.3 ml.). The resultant solution is diluted with a little water (3.5 ml.) and added slowly to carbon disulphide (65 ml.) under reflux. After addition, heating is continued for 3 hours, the mixture is filtered from mercuric sulphide and the filtrate is concentrated under reduced pressure. The residue is extracted with acetonitrile, filtered and the filtrate concentrated to afford p-hydroxyphenyl-ethyl isothiocyanate as a light yellow oil.

This is dissolved immediately in ethanol and 4-(4(5)-aminobutylimidazole (2.2 g.) is added. The solution is heated for 4 hours under reflux and concentrated under reduced pressure. The residue is chromatographed on a column of silica gel using ethyl acetate as eluant. The product obtained is recrystallized twice from isopropyl alcohol-ether to afford N-(2-(p-hydroxyphenyl)ethyl)-N'-(4-(4(5)-imidazolyl)butyl)thiourea (2.1 g.), M.P. 170–172° C.

EXAMPLE 14

Preparation of N-methyl-N'-(4-(5-bromo-4-imidazolyl)butyl)thiourea (i) To a stirred mixture of (4(5)-(4-aminobutyl)imidazole) (15.8 g. containing 8% weight/weight ethanol) in concentrated sulphuric acid (250 ml.) is added silver sulphate (31.2 g.). Light is excluded from the reaction mixture and bromine (10.75 ml.) is added, followed by sulphuric acid washings (25 ml.). The reaction mixture is stirred in the dark for 2–5 days, filtered and the precipitate washed with sulphuric acid (50 ml.). The combined filtrates are added to water (1 l.) and neutralised to pH 6–7 with sodium carbonate with cooling. Following filtration, the filtrate is concentrated under reduced pressure. The residue is converted to the hydrochloride using hydrogen chloride in isopropyl alcohol. The hydrochloride is passed down Amberlite ion-exchange resin IRA 401 ($SO_4^{--}$) and eluted with water. The eluate is concentrated under reduced pressure and the residue extracted with methanol and diluted with ethanol yielding 5-bromo-4-aminobutylimidazole sulphate (15.8 g.). Recrystallization from water-methanol-ethanol affords the analytically pure product (11.2 g.), M.P. 92–95° C.

(ii) A solution of 5-bromo - 4 - aminobutylimidazole (2.39 g.) prepared from the hydrochloride and potassium carbonate and methyl isothiocyanate (0.73 g.) in ethanol (10 ml.) is heated under reflux for 2 hours. Concentration followed by recrystallization of the residue twice from ethanol-ether affords N-methyl-N'-(4-(5-bromo-4-imidazolyl)butyl)thiourea, M.P. 153–155° C.

EXAMPLE 15

Preparation of N-methyl-N'-(4-(2-methylthio-4(5)-imidazolyl)butyl)thiourea

A solution of 4(5)-(4-aminobutyl)imidazole-2-thione (6 g.) in methanol (200 ml.) saturated with hydrogen chloride is boiled under reflux for 3 hours and then concentrated in vacuo. The resulting solid is recrystallized from ethanol to yield 2-methylthio-4(5)-(4-aminobutyl) imidazole dihydrochloride (5.6 g.), M.P. 181–182° C. The latter (4.5 g.) is neutralized with sodium hydroxide (1.4 g.) in ethanol (100 ml.) at 0° C.; the mixture is then filtered from sodium chloride, boiled under reflux for 2 hours with methyl isothiocyanate (1.46 g.) and finally concentrated under reduced pressure. The resulting solid is extracted with isopropanol (3× 100 ml.) at 50° C. and the combined extracts are cooled to 0° C. The material which crystallizes out is collected and recrystallized from 85% ethanol to afford analytically pure (N-methyl-N'-(4-(2 - methylthio-4(5)imidazolyl))butyl) thiourea, M.P. 185–186° C.

EXAMPLE 16

Preparation of N-methyl-N'-(4-(3-(1,2,4-triazolyl))butyl)thiourea (i) 5-phthalimidovaleroyl chloride (90.0 g.) is added portionwise to a suspension of thiosemicarbazide (34.0 g.) in anhydrous pyridine (220 ml.) at 0–5° C. After addition the mixture is kept at 0° C. for 1 hour and set aside overnight at room temperature. Following addition to water (2 l.) the white solid is collected and washed with 50% aqueous acetic acid and then water. Recrystallization from nitromethane affords 1-(5-(phthalimidovaleroyl)thiosemicarbazide) (69 g.), M.P. 196° C.

(ii) 1-(5-phthalimidovaleroyl)thiosemicarbazide (69 g.) dissolved in a solution prepared from sodium (6.25 g.) in ethanol (860 ml.) is heated under reflux for 16 hours. Concentration to low bulk, followed by the addition of ice-water affords a white crystalline solid, which is collected and washed successively with water, ethanol and ether to give 3-(4 - phthalimidobutyl)-1,2,4-triazoline-5-thione (33 g.), M.P. 223–225° C.

(iii) The triazolinethione (30.5 g.) is dissolved in ethanol (360 ml.) and heated under reflux with stirring for 2 hours in the presence of Raney nickel (90 g.). Filtration, followed by concentration and the addition of water affords 3-(4-phthalimidobutyl)-1,2,4-triazole (13.3 g.), M.P. 169–171° C. A sample recrystallized from water has M.P. 171–172° C.

(iv) The phthalimido derivative (13.0 g.) is hydrolyzed with 5 N hydrochloric acid for 8 hours under reflux. Following cooling and removal of phthalic acid, the filtrate is concentrated. The solid residue is triturated with ethanol-ether (1:1) and filtered to afford 3-(4-aminobutyl)-1,2,4-triazole dihydrochloride (10.0 g.), M.P. 171–172° C.

(v) The amine hydrochloride (5.0 g.) is converted into its free base with aqueous potassium carbonate by concentration followed by extraction with ethanol-ether (3:1). The base is dissolved in ethanol and caused to react with methylisothiocyanate (1.87 g.) in ethanol. The product obtained is recrystallized from water followed by ethanol-ether to afford N-methyl-N'-(4-(3-(1,2,4-triazolyl))ethyl)thiourea (3.15 g.), M.P. 133–134° C.

EXAMPLE 17

Preparation of N-methyl-N'-(4-(2-pyridyl)butyl)thiourea (i) 2-(3-cyanopropyl)pyridine (14.6 g.) in dry ether (100 ml.) is added dropwise to a stirred suspension of lithium aluminium hydride (9.5 g.) in dry ether (300 ml.). The mixture is heated under reflux for 3 hours, cooled and treated successively with water, aqueous sodium hydroxide and water. Extraction with chloroform, followed by fractionation affords 2-(4-aminobutyl)pyridine (6.7 g.), M.P. 100–101° C./1.0 mm.

(ii) The reaction of 2-(4-aminobutyl)pyridine (3.0 g.) and methyl isothiocyanate (1.6 g.) in ethanol (25 ml.) for 0.5 hour followed by chromatography of the product on silica and elution with ethyl acetate affords N-methyl-N'-(4-(2-pyridyl)butyl)thiourea (3.0 g.) as a colorless oil.

EXAMPLE 18

Preparation of N-methyl-N'-(4-(2-thiazolyl)butyl)thiourea (i) Liquid ammonia (20 g.) and 4-phthalimidovaleronitrile (67 g.) is added to a cooled solution of hydrogen sulphide (50 g.) in methyl alcohol (500 ml.). The sealed reaction vessel is then heated at 40° C. for 3 days with stirring. Concentration followed by recrystallization from isopropyl acetate yields 4-phthalimidovaleramide, M.P. 143–146° C.

(ii) A mixture of the thioamide (11.0 g.) and bromacetal (8.3 g.) is heated for 1 hour on the steam-bath. Following filtration and washing with water, the crude product is dissolved in hydrochloric acid and precipitated by the addition of saturated sodium acetate. Recrystallization from isopropyl alcohol-water finally yields 2-(4-phthalimidobutyl)thiazole (5.22 g.), M.P. 86–88° C.

(iii) 2-(4-phthalimidobutyl)thiazole (5.0 g.) is hydrolyzed with hydrochloric acid in the usual way. The amine hydrochloride obtained is basified with potassium carbonate and extracted with ether-ethanol (3:1) to give 2-(4-amino-butyl)thiazole) as a colorless oil. The reaction of the amine (2.0 g.) and methyl isothiocyanate (0.98 g.) in ethanol (10 ml.) for 1 hour, followed by chromatography of the product on silica gel with ethyl acetate as eluent gives N-methyl-N'-(4-(2-thiazolyl)butyl)thiourea (2.5 g.) as a colorless oil. Formation of the hydrobromide salt yields a crystalline solid, M.P. 130–132° C.

EXAMPLE 19

Ingredients: Amounts, mg.
- N - methyl - N'-(4-(4(5)-imidazolyl)butyl)thiourea ------- 150
- Sucrose ------- 75
- Starch ------- 25
- Talc ------- 5
- Stearic acid ------- 2

The ingredients are screened, mixed and filled into a hard gelatin capsule.

EXAMPLE 20

Ingredients: Amounts, mg.
- N - methyl-N'-(4-(5-bromo-4-imidazolyl)butyl)thiourea ------- 200
- Lactose ------- 100

The ingredients are screened, mixed and filled into a hard gelatin capsule.

EXAMPLE 21

Ingredients: Amounts, mg.
- N-methyl-N'-(4-(2-thiazolyl)butyl)thiourea ------- 100
- Lactose ------- 75
- Magnesium stearate ------- 5

The ingredients are mixed and filled into a hard gelatin capsule.

The capsules prepared as in Examples 19 to 21 are administered orally to a subject having excessive gastric acid secretion within the dose ranges given hereabove.

What is claimed is:

1. A pharmaceutical composition to inhibit H-2 histamine receptors comprising a pharmaceutical carrier and in an effective amount to inhibit H-2 histamine receptors a thiourea compound of the formula:

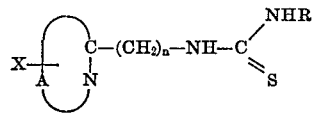

in which:
   A is such that with the carbon and nitrogen atoms shown it forms an imidazolyl ring;
   $n$ is from 3 to 6;
   R is hydrogen, lower alkyl, benzoyl or substituted or unsubstituted phenylethyl; and
   X is hydrogen, halogen or lower alkylthio or a pharmaceutically acceptable acid addition salt thereof.

2. A pharmaceutical composition according to claim 1 in which:
   A is such that with the carbon and nitrogen atoms shown it forms a 4(5)-imidazolyl ring.

3. A pharmaceutical composition according to claim 1 in which the thiourea compound is N-methyl-N'-(4-(4(5)-imidazolyl)butyl)thiourea.

4. A pharmaceutical composition according to claim 3 in which the hydrochloride salt of N-methyl-N'-(4-(4(5)-imidazolyl)butyl)thiourea is used.

5. A pharmaceutical composition according to claim 1 in which the thiourea compound is N-methyl-N-(4-(5-bromo-4-imidazolyl)butyl)thiourea.

6. A method of inhibiting H–2 histamine receptors which comprises administering to an animal in an amount sufficient to inhibit H–2 histamine receptors a thiourea compound of the formula:

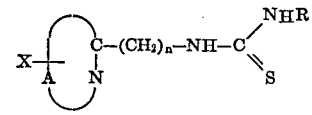

in which:
   A is such that with the carbon and nitrogen atoms shown it forms an imidazolyl ring;
   $n$ is from 3 to 6;
   R is hydrogen, lower alkyl, benzoyl or substituted or unsubstituted phenylethyl; and
   X is hydrogen, halogen or lower alkylthio or a pharmaceutically acceptable acid addition salt thereof.

7. A method according to claim 6 in which A is such that with the carbon and nitrogen atoms shown it forms a 4(5)-imidazolyl ring.

8. A method according to claim 6 in which the thiourea compound is N-methyl-N'-(4-(4(5)-imidazolyl)butyl)thiourea.

9. A method according to claim 8 in which the hydrochloride salt of N-methyl-N'-(4-(4(5)-imidazolyl)butyl)thiourea is used.

10. A method according to claim 6 in which the thiourea compound is N-methyl-N'-(4-(5-bromo-4 - imidazolyl)butyl)thiourea.

11. A pharmaceutical composition according to claim 1 in which A is such that with the carbon and nitrogen atoms shown it forms an imidazolyl ring.

12. A method according to claim 6 in which A is such that with the carbon and nitrogen atoms shown it forms an imidazolyl ring.

13. A method of inhibiting gastric acid secretion which comprises administering internally to an animal in an amount sufficient to inhibit gastric acid secretion a thiourea compound of the formula:

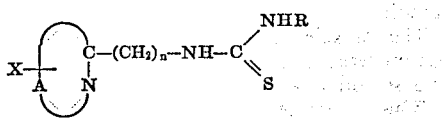

in which:
A is such that with the carbon and nitrogen atoms shown it forms an imidazolyl ring;
$n$ is from 3 to 6;
R is hydrogen, lower alkyl, benzoyl or substituted or unsubstituted phenylethyl; and
X is hydrogen, halogen or lower alkylthio or a pharmaceutically acceptable acid addition salt thereof.

References Cited
FOREIGN PATENTS 1,069,117  5/1967  Great Britain _____ 260—309

STANLEY J. FRIEDMAN, Primary Examiner

U.S. Cl. X.R.

260—309; 424—263, 269, 270